United States Patent [19]
Kuroiwa et al.

[11] Patent Number: 5,654,972
[45] Date of Patent: Aug. 5, 1997

[54] PROCESSOR HAVING TEST CIRCUIT

[75] Inventors: Koichi Kuroiwa; Hideyuki Iino, both of Kawasaki, Japan

[73] Assignee: Fujitsu Limited, Kawasaki, Japan

[21] Appl. No.: 226,854

[22] Filed: Apr. 13, 1994

[30] Foreign Application Priority Data

Jun. 15, 1993 [JP] Japan ................. 5-143888

[51] Int. Cl.$^6$ .................................................. G06F 11/00
[52] U.S. Cl. ........................................................ 371/22.1
[58] Field of Search ............................ 371/27, 25.1, 22.3, 371/22.4, 22.5, 22.6; 395/183.06; 324/73.1

[56] References Cited

U.S. PATENT DOCUMENTS

| | | | |
|---|---|---|---|
| 4,519,078 | 5/1985 | Komonytsky | 371/25 |
| 4,995,039 | 2/1991 | Sakahita et al. | 371/22.3 |
| 5,361,230 | 11/1994 | Ikeda et al. | 365/194 |

FOREIGN PATENT DOCUMENTS 0196152  10/1986  European Pat. Off. .

*Primary Examiner*—Vincent P. Canney
*Attorney, Agent, or Firm*—Staas & Halsey

[57] ABSTRACT

A processor includes a register file unit for storing operands and operation results, operation units for performing operations on the operands and writing operation results into the register file unit in a normal operation mode, and a random number generator for generating random numbers and outputting, instead of the operands, the random numbers to the operation units in a test mode. Further, the processor includes a selector part for selecting the operands from the register file unit in the normal operation mode and selecting the random numbers generated by the random number generator in the test mode, the operands or the random numbers selected by said selector being applied to the operation units.

10 Claims, 8 Drawing Sheets

PROCESSOR HAVING TEST CIRCUIT

BACKGROUND OF THE INVENTION

1. Field of the Invention

The present invention generally relates to processors such as microprocessors, and more particularly to a microprocessor having a test circuit for performing a burn-in test in order to identify a device having an initial fault and eliminate such a device.

Recently, it has been required that less-expensive microprocessors be developed in a short time. The short-term development of microprocessors has been attempted by automatically performing the design tasks of the device specification, description of device functions, logic synthesis and layout. The reduction in the production cost has been attempted by optimizing the chip floor plan taking into account reduction in the chip area and the test circuit.

Before microprocessors are delivered by manufacturers, a function test and a burn-in test are performed by utilizing test circuits in order to ensure reliability of the delivered microprocessors. In order to efficiently perform these tests, it is preferable to equip microprocessors with built-in test circuits. However, the built-in test circuits will lead to an increase in the chip area.

2. Description of the Prior Art

A conventional microprocessor has an external terminal used to select a burn-in test mode, and a circuit configuration capable of testing almost all transistors formed in the microprocessor by means of a clock input signal. Also, the burn-in test for a microprocessor having a built-in micro-ROM is performed by allowing the micro-ROM to freely run, whereby almost all transistors of the microprocessor can be tested. A microprocessor which does not have a micro-ROM is equipped with a latch circuit with a scan-in terminal supplied with a scan-in signal in order to perform the internal logic operations. A microprocessor which does not have a micro-ROM is also tested by another testing method in which instructions are issued at random by a built-in controller in order to perform the internal logic operations.

FIG. 1 shows a conventional master/slave latch circuit with a scan-in terminal, and FIG. 2 shows a conventional master/slave latch circuit. In FIGS. 1 and 2, IN denotes an input signal in a normal operation, SIN denotes a scan input signal, and OUT denotes an output signal. Each of the master/slave latch circuits shown in FIGS. 1 and 2 includes clocked CMOS inverters 1 and 2, each of which receives complementary control signals C and CX which enable and disable each of the CMOS inverters 1 and 2. Further, each of the latch circuits shown in FIGS. 1 and 2 includes CMOS inverters 3, 4, 5 and 6. The latch circuit shown in FIG. 1 includes transfer gates 7 and 8. The transfer gate 7 is made up of a P-channel MOS transistor 9 and an N-channel MOS transistor 11, and the transfer gate 8 is made up of a P-channel MOS transistor 10 and an N-channel MOS transistor 12. The transfer gate 7 is turned ON and OFF by complementary control signals CA and CAX, and the transfer gate 8 is turned ON and OFF by complementary control signals CB and CBX.

FIG. 3 is a block diagram which shows a flow of instructions and data when the burn-in test is carried out for a microprocessor which employs a method of executing internal logic operations in response to instructions generated at random by a controller. A microprocessor 13 shown in FIG. 3 includes an input unit 14 establishing an interface with an external bus, an output interface 15, establishing an interface with the same or another external bus, and arithmetic and logic units 16–18 (hereinafter simply referred to as operation units). For example, the operation units 16–18 are an adder, a subtracter and a multiplier, respectively. Further, the microprocessor 13 includes a register file unit 19 and an address generator 20. The register file unit 19 temporarily stores operands to be supplied to the operation units 16–18 and the operation results supplied therefrom. The address generator 20 generates an address in, for example, the register file unit 19.

A controller 21 controls the operation units 16–18 and the address generator 20. An operation operand data generator 22 generates operation operand data used when the burn-in test is carried out (the burn-in test mode). Broken lines 23 denote internal buses specifically provided for transferring instructions in the burn-in test mode. The arrows added to the broken lines shown in FIG. 3 indicate the directions of flow of instructions. Solid lines 24–27 are internal buses specifically provided for transferring data when the burn-in test is performed. The arrows added to the solid lines indicate the directions of flow of data. For the sake of simplicity, internal buses used to transfer instructions in the normal operation mode and internal buses used to transfer data in the normal operation mode are omitted.

In the burn-in test mode, the operand data generated by the operand data generator 22 is supplied to the output unit 15, the operation units 16–18, the register file unit 19, the address generator 20 and the controller 21, so that the output units 15, the operation units 16–18, the register file unit 19, the address generator 20 and the controller 21 are initialized.

In microprocessors configured so that almost all the internal transistors can be switched by means of the clock signal alone, complex setting performed in the test operation is not needed and the test can be easily performed.

However, microprocessors having a circuit configuration in which the internal logic operation is performed by applying the scan signal to the scan-in terminal have the following disadvantages. Such microprocessors have the latch circuits configured as shown in FIG. 1. More specifically, each of these latch circuits is equipped with the scan-in terminal, and hence needs a large number of transistors. This leads to an increase in the circuit scale and an increase in the chip cost.

The microprocessor configured so as to use the operand data generator 22 specifically provided for the burn-in test shown in FIG. 3 has a disadvantage in that there is a need for the internal buses 23–27 specifically used for the burn-in test and in that it is necessary to provide functional blocks such as the output unit 15, the operation units 16–18, the register file unit 19, the address generator 20 and the controller 21 with selecting circuits selecting either the paths used in the normal operation paths or the paths used in the burn-in test mode. This increases the scale of the circuit configuration and the chip cost.

SUMMARY OF THE INVENTION

It is a general object of the present invention to provide a processor in which the above disadvantages are eliminated.

A more specific object of the present invention is to provide a reduced-scale, less-expensive processor having a test circuit that efficiently performs the burn-in test.

These objects of the present invention are achieved by a processor comprising:

register means for storing operands and operation results;

operation means for performing operations on the operands and writing operation results into the register means in a normal operation mode; and random number generating means for generating random numbers and outputting, instead of the operands, the random numbers to the operation means a test mode; and selector means for selecting the operands from the register means in the normal operation mode and selecting the random numbers generated by the random number generating means in the test mode, the operands or the random numbers selected by the selector means being applied to the operation means.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENT

Figure 1:
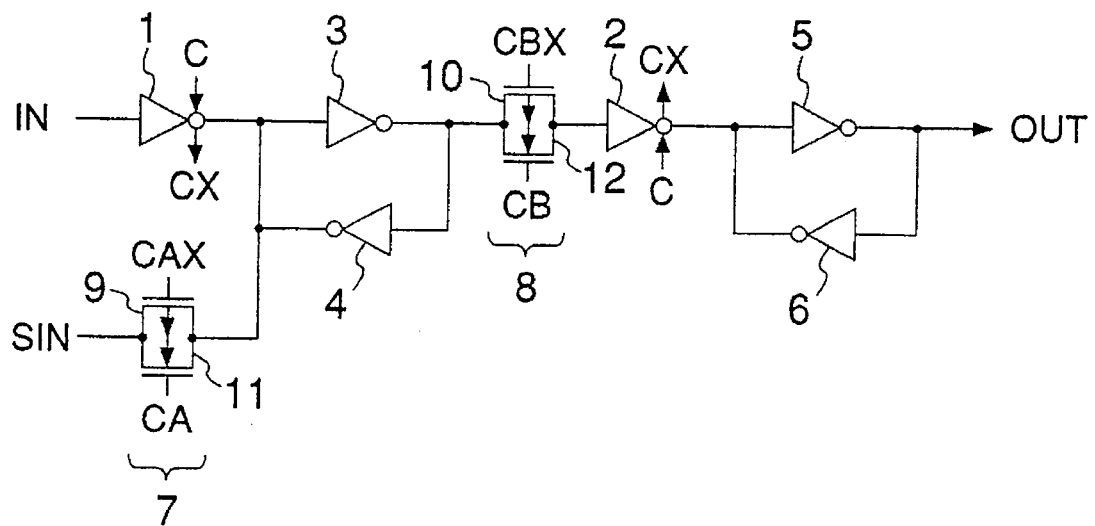
FIG. 1 is a block diagram of a conventional master/slave latch circuit equipped with a scan-in terminal provided in a microprocessor.
Figure 2:
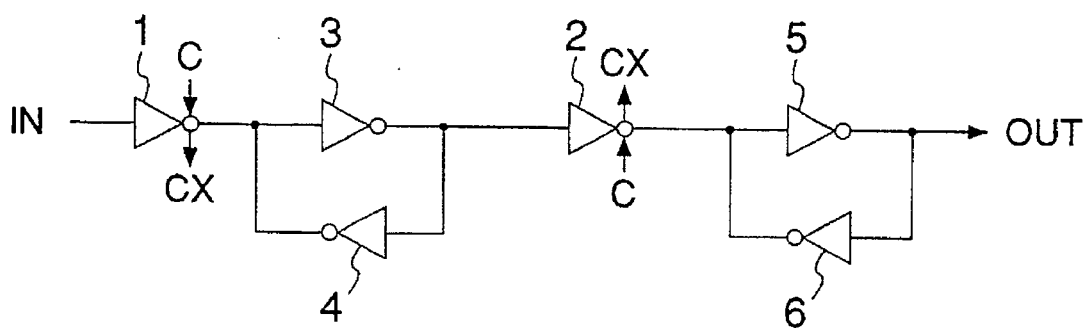
FIG. 2 is a block diagram of another conventional master/slave latch circuit provided in a microprocessor.
Figure 3:
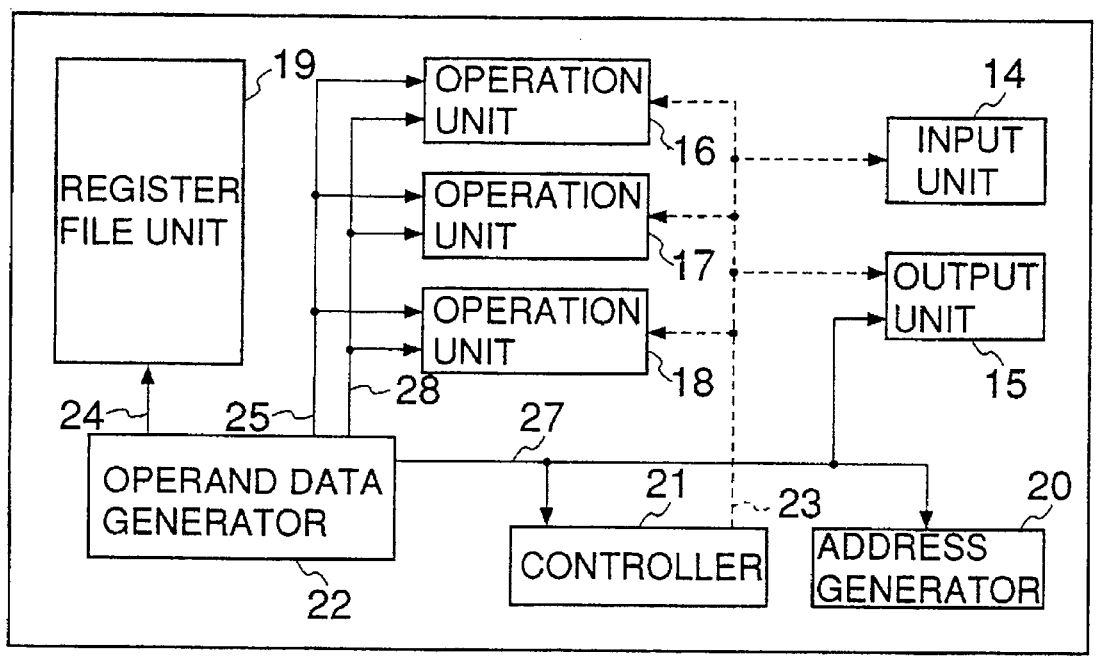
FIG. 3 is a block diagram of a conventional microprocessor.
Figure 4:
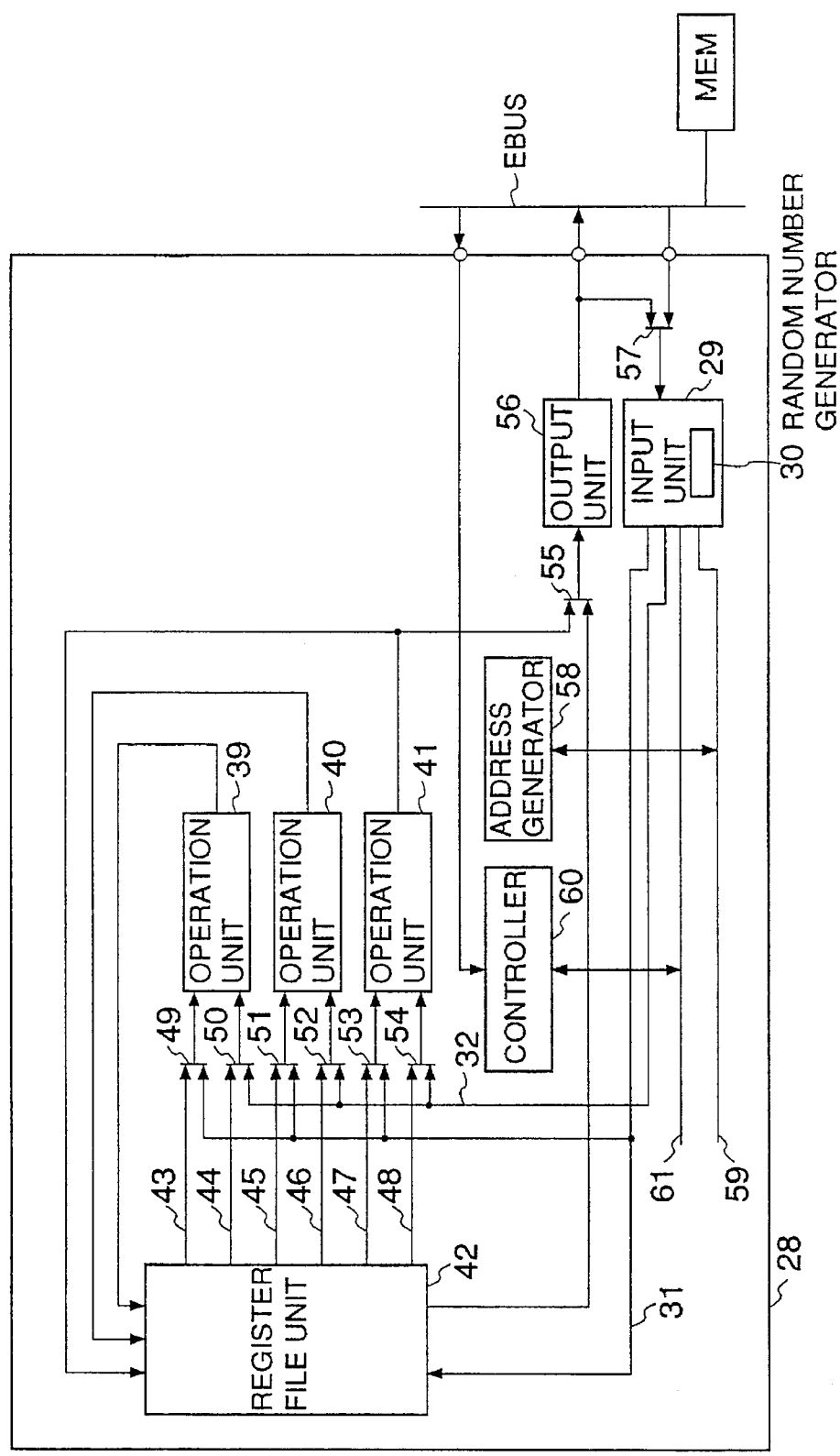
FIG. 4 is a block diagram of a processor according to an embodiment of the present invention.

FIG. 4 shows a microprocessor 28 according to an embodiment of the present invention. The microprocessor 28 has three arithmetic and logic units (operation units) 39, 40 and 41, each of which units is capable of handling a 64-bit operand. The microprocessor 28 includes an interface unit, a random number generator 30 provided in the input unit 29, and internal operand buses 31 and 32 respectively transferring operands. The input unit 29 establishes an interface with an external bus EBUS connected to the microprocessor 28.

Figure 5:
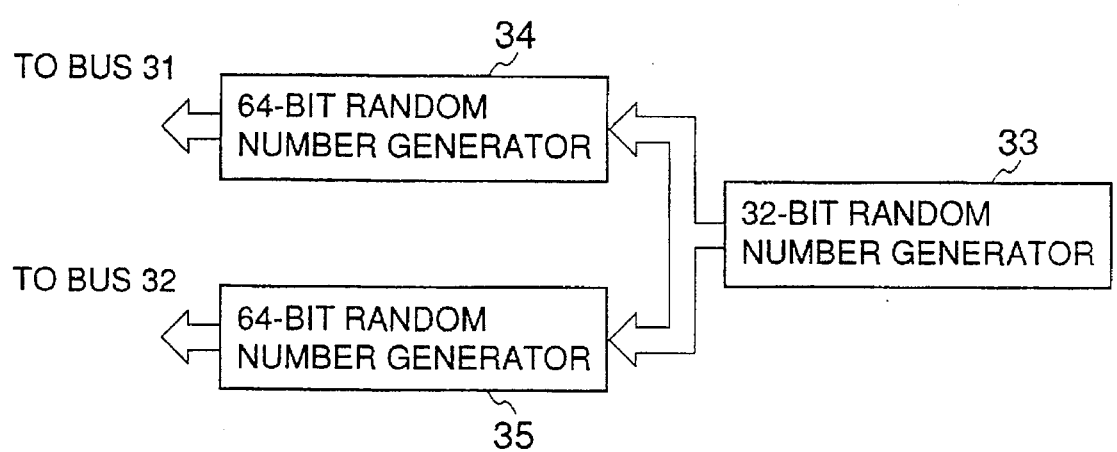
FIG. 5 is a block diagram of a random number generator shown in FIG. 4.

The random number generator 30 outputs a 64-bit random number to the internal operand buses 31 and 32. FIG. 5 shows the structure of the random number generator 30. As shown in FIG. 5, the random number generator 30 is made up of a 32-bit random number generator 33, and two 64-bit random number generators 34 and 35 respectively connected to the internal operation buses 31 and 32. The 32-bit random number generator 30 generates a 32-bit random number. Each of the 64-bit random number generators 34 and 35 derives a 64-bit random number from the 32-bit random number generated by the generator 33.

Figure 6:
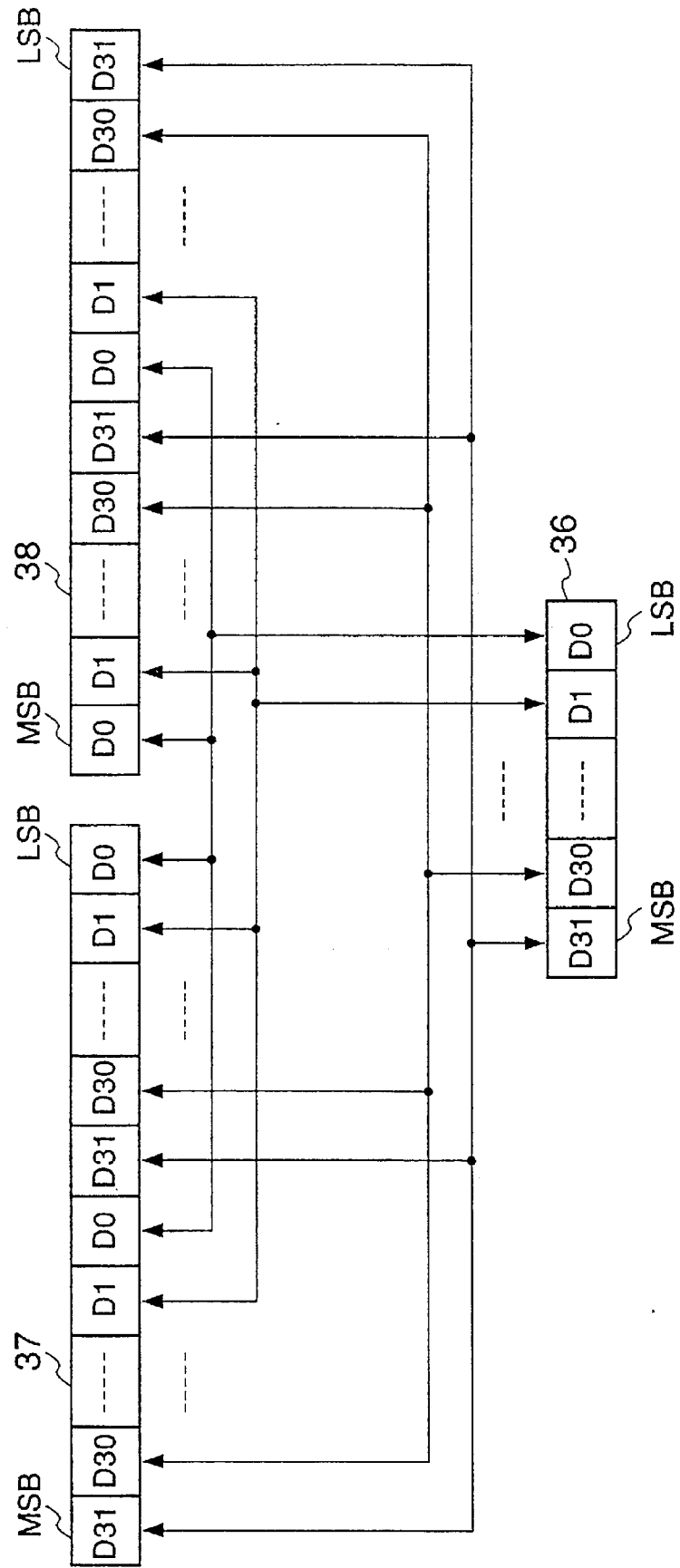
FIG. 6 is a diagram showing the process of generating two different random numbers in the random number generator shown in FIG. 5.

FIG. 6 shows examples of the random numbers generated by the generators 33, 34 and 35 shown in FIG. 5. The reference number 36 denotes a 32-bit random number generated by the 32-bit random number generator 33, the reference number 37 denotes a 64-bit random number generated by the 64-bit random number generator 34, and the reference number 38 denotes a 64-bit random number generated by the 64-bit random number generator 35.

In the example shown in FIG. 6, the 64-bit random number generator 34 processes a 32-bit random number generated by the generator 33, D31 (MSB: Most Significant Bit), D30, ..., D1 and D0 (LSB: Least Significant Bit), and generates therefrom a 64-bit random number D31 (MSB), D30, ..., D1, D0, D31, D30, ..., D1, D0 (LSB). Also, in the example shown in FIG. 6, the 64-bit random number generator 35 processes the 32-bit random number generated by the generator 33, D31 (MSB: Most Significant Bit), D30, ..., D1 and D0 (LSB: Least Significant Bit), and generates therefrom a 64-bit random number D0 (LSB), D1, ..., D30, D31, D0, D1, ..., D30, D31 (MSB).

The operation units 39, 40 and 41 shown in FIG. 4 are, for example, an adder, a subtracter and a multiplier, respectively. Further, the microprocessor 4 includes a register file unit 42, which temporarily stores operands to be supplied to the operation units 39–41 and the operation results output thereby. Internal operand buses 43–48 extend from the register file unit 42. A selector 49 selects either the internal operand bus 43 or the internal operand bus 31. A selector 50 selects either the internal operand bus 44 or the internal operand bus 32. A selector 51 selects either the internal operand bus 45 or the internal operand bus 31. A selector 52 selects either the internal operand bus 46 or the internal operand bus 32. A selector 53 selects either the internal operand bus 47 or the internal operand bus 31. A selector 54 selects either the internal operand bus 48 or the internal operand bus 32.

A selector 55 selects either the operation result supplied from the operation unit 41 or the operation result supplied from the register file 42. An output unit 56 establishes an interface with the external bus EBUS to which the microprocessor 28 is connected. A selector 57 selects either the operation result output by the output unit 56 or an input signal supplied from the outside of the microprocessor 28. An address generator 58 generates the address of, for example, a storage area in an external memory device MEM, and is connected to the input unit 29 via an internal address bus 59. A controller 60 controls the operation units 39–41, the address generator 58 and the selectors 49–55, and 57. The controller 60 is connected to the input unit 29 via an internal data bus 61.

Figure 7:
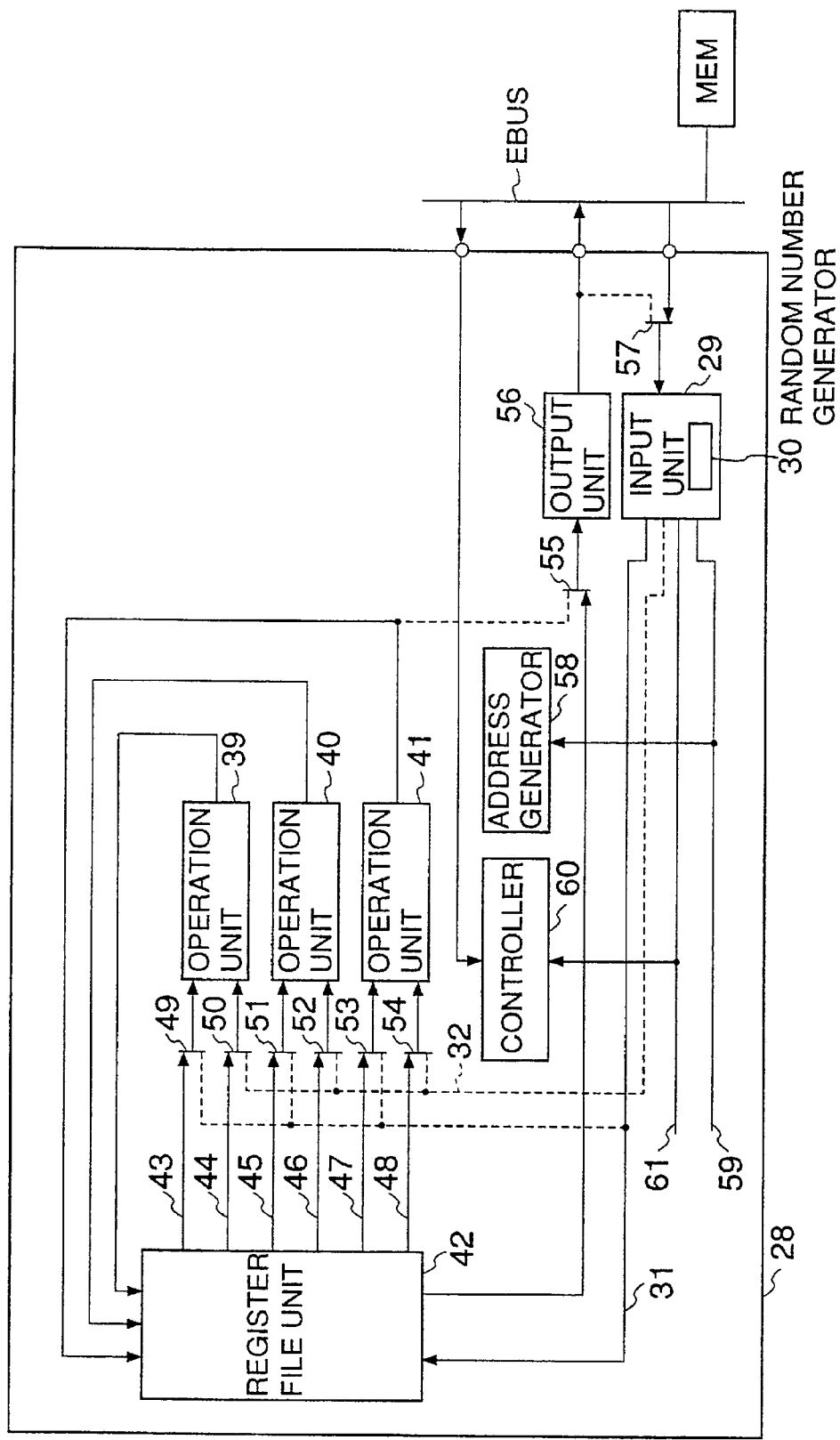
FIG. 7 is a block diagram illustrating the operation of the microprocessor in a normal operation mode.
Figure 8:
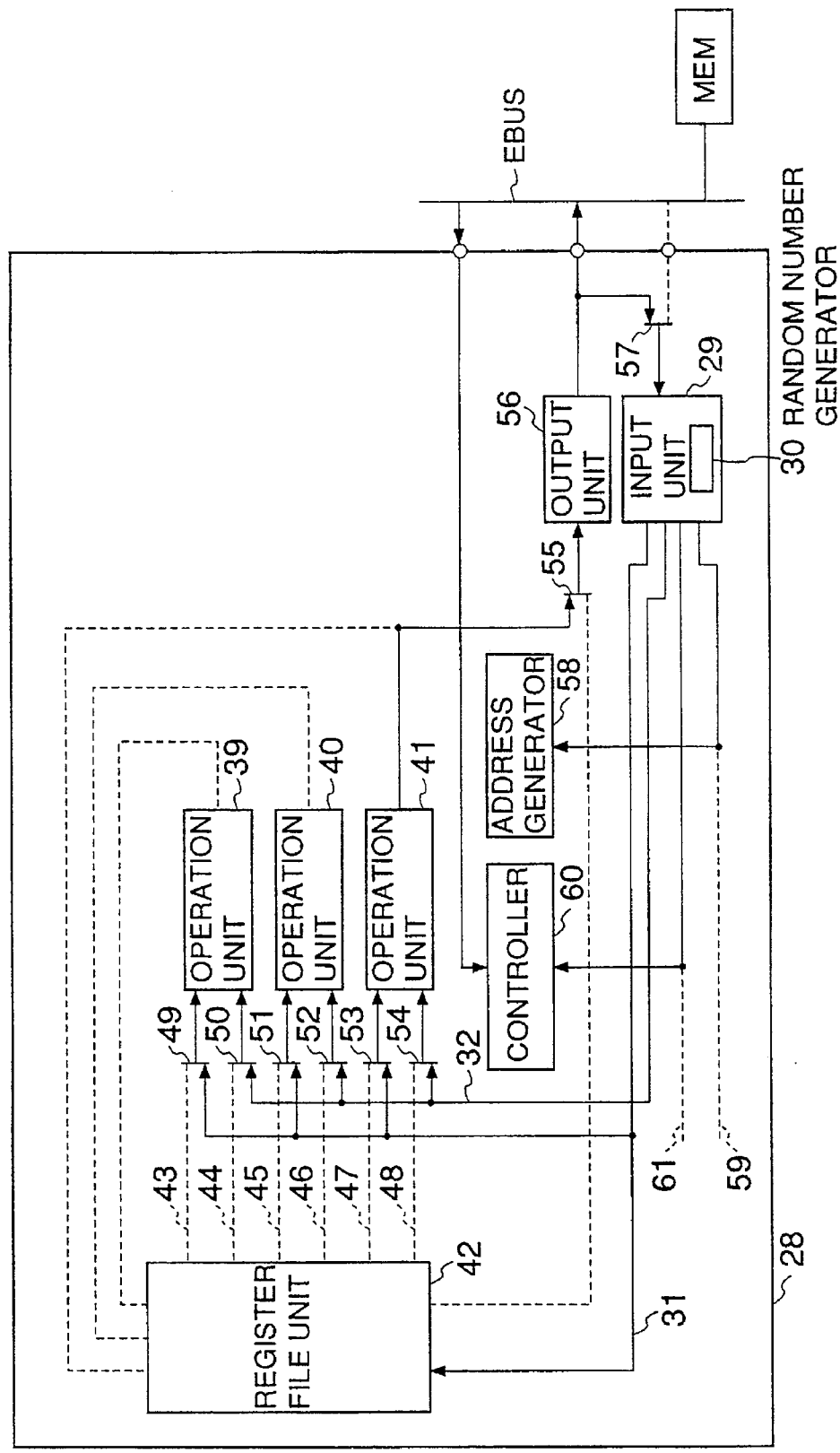
FIG. 8 is a block diagram illustrating the operation of the microprocessor in a burn-in test mode.

In the normal mode of the microprocessor 28, instructions and so on flow as indicated by the solid lines with the arrows shown in FIG. 7. In the burn-in test mode, random numbers and so on flow as indicated by the solid lines with the arrows shown in FIG. 8.

More particularly, in the normal operation mode, an instruction is written into an instruction register (not shown) provided in the controller 60 via the input unit 29 and the internal data bus 61. Thereafter, starting information is written into an initiating register provided in the controller 60.

When the controller 60 confirms receipt of the starting information, it takes out the instruction from the built-in instruction register. If the above instruction is a load instruction, operand data is read from the external memory device MEM connected to the external bus EBUS connected to the input unit 29 via the selector 57, and is written into the register file unit 42 via the input unit 29 and the internal operand bus 31. If the taken-out instruction is a multiplying instruction, when the operand data are ready in the register file unit 42, they are transferred to, for example, the operation unit 41, which performs the multiplying operation on the received operand data. Then, the operation result is transferred to the register file 42.

If the taken-out instruction is a store instruction, the operation result output by the operation unit 41 is output from the register file unit 42 to the external memory device MEM via the selector 55 and the output unit 56. When the external memory device MEM is accessed when the load instruction or the store instruction is performed, the address is generated by the address generator 58 and is output to the external memory device MEM.

In the burn-in test mode set by the controller in response to a control signal supplied from an external device (not shown) connected to the external bus EBUS, the random number generator 30 provided in the input unit 29 starts to operate, and the random number generated by the 64-bit random number generator 34 of the random number generator 30 is applied to all the operation units 39–41 via the internal operand bus 31 and the selectors 49, 51 and 53. Also, the random number generated by the 64-bit random number generator 35 of the random number generator 30 is applied to all the operation units 39–41 via the internal operand bus 32 and the selectors 50, 52 and 54. The operation units 38–41 perform the respective operations on the 64-bit random number from the generator 34 and the 64-bit random number from the generator 35.

The 64-bit random number output by the 64-bit random number generator 34 of the random number generator 30 is supplied to the register file unit 42 via the internal operand bus 31. The register file unit 42 operates based on the received 64-bit random number.

The operation result (the result of the multiplying operation) of the operation unit 41 is not stored in the register file 42 but is transferred to the output unit 56 via the selector 55. Hence, the output unit 56 operates based on the operation result output by the operation unit 41. The operation result output by the operation unit 41 is output to the external bus EBUS. The operation result output by the operation unit 41 is input to the input unit 29 via the output unit 56 and the selector 57, and is further input to the address generator 58 via the internal address bus 59. Further, the above operation result is supplied to the controller 60 via the internal data bus 61. Then, the address generator 58 and the controller 60 operate on the operation results from the operation unit 41 as an address and an instruction, respectively.

According to the above-mentioned embodiment of the present invention, by providing the random number generator 30 (which generates the random number in the burn-in test mode) in the input unit 29, it is not necessary to provide the functional blocks such as the operation units 39–41, the register file unit 42, the output unit 56, the address generator 58 and the controller 60 with selecting circuits which select either the paths used in the burn-in test mode or the paths used in the normal operation mode, whereas the selectors 49–54, 55 and 57 are needed. Hence, the circuit scale and the chip cost can be reduced.

Figure 9:
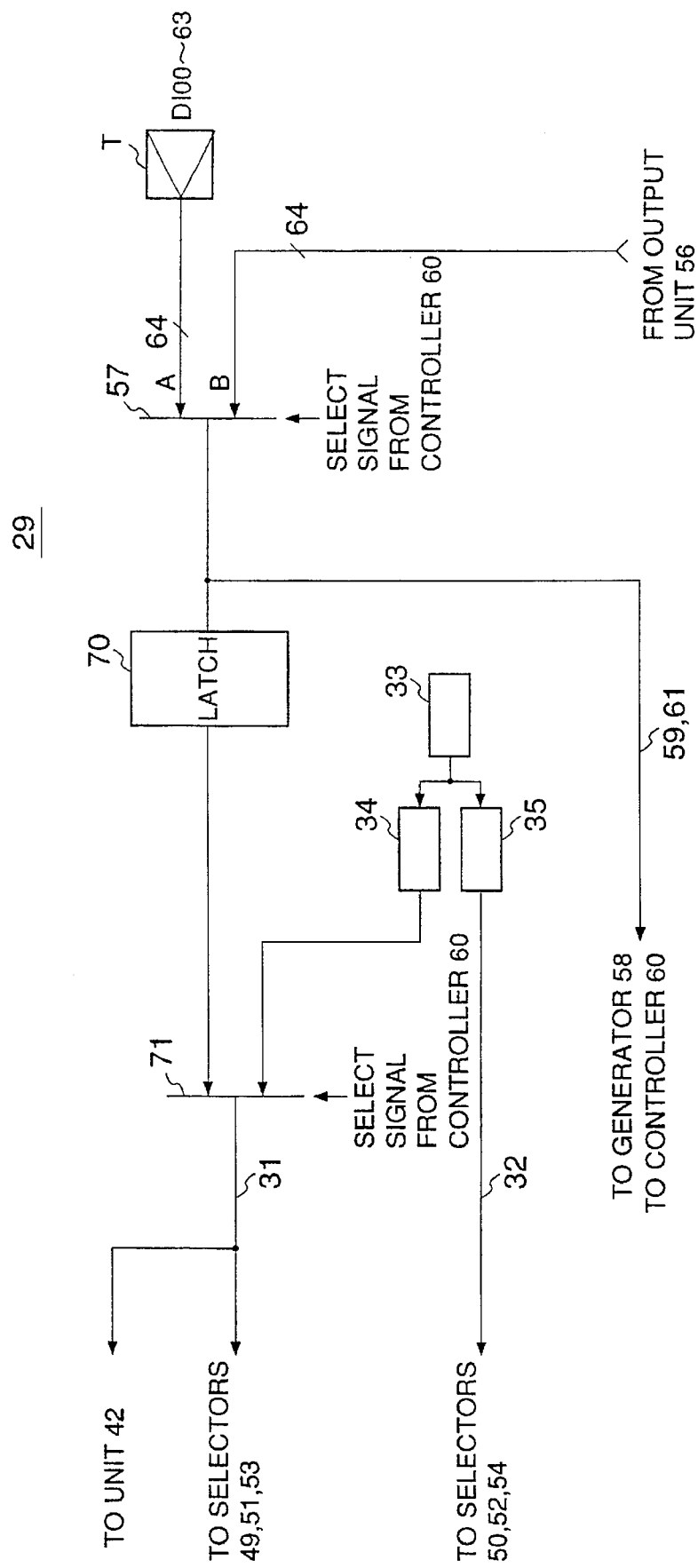
FIG. 9 is a block diagram of an input unit shown in FIG. 4.

FIG. 9 is a block diagram of the input unit 29 shown in FIG. 4. In FIG. 9, parts that are the same as those shown in the previously described figures are given the same reference numbers. A latch circuit 70 adjusts the timing of transfer of the output signal of the selector 57. A selector 71 controlled by the controller 60 selects either the signal from the latch circuit 70 or the 64-bit random number generator 34. The selected random number is applied to the unit 42 and the selectors 49, 51 and 53. The random number generated by the 64-bit random number generator 35 is applied to the selectors 50, 52 and 54. The selector 57 is connected to a terminal group T consisting of terminals respectively applied to the 64 bits of the input data from the external bus EBUS. In the burn-in test mode, the selector 57 outputs the 64-bit random number from the output unit 56 to the address generator 59 and the controller 60. In the burn-in test mode, the selector 71 selects the 64-bit random number generator 34.

The random number generator 30 is not limited to the configuration shown in FIG. 5. For example, the random number generator 30 may be made up of a $2^k$-bit generator ($k=1, 2, 3, 4$) and a signal processing circuit. The $2^k$-bit random numbers generated by the above generator are processed by the signal processing circuit, which generates two different 64-bit random numbers therefrom.

It is to be noted that the result of the operation on the two random numbers is applied to the address generator 58 and the controller 60. There is a possibility that the random numbers of the random number generator 30 may not be completely random. Hence, it is not preferable to directly apply the random numbers generated by the random number generator 30 to the address generator 58 and the controller 60. It can be said that the results of the operation on such random numbers are completely random. Hence, the burn-in test for the address generator 58 and the controller 60 can be completely performed by means of the result of the operation on the random numbers.

The present invention is not limited to the specifically disclosed embodiment, and variations and modifications may be made without departing from the scope of the present invention.

What is claimed is:

1. A processor comprising:

register means for storing operands and operation results;

operation means for performing operations on the operands and writing operation results into the register means in a normal operation mode;

random number generating means for generating random numbers and outputting, instead of said operands, the random numbers to the operation means in a test mode; and selector means for selecting the operands from the register means in the normal operation mode and selecting the random numbers generated by the random number generating means in the test mode, the operands or the random numbers selected by said selector means being applied to the operation means.

2. The processor as claimed in claim 1, further comprising means for outputting at least one of the operation results output by the operation means to an outside of the processor in the test mode.

3. The processor as claimed in claim 1, further comprising selector means for selecting the operation results from the register means in the normal operation mode and for selecting at least one of the operation results output by the operation means to an outside of the processor in the test mode.

4. The processor as claimed in claim 1, further comprising means for outputting at least one of the operation results output by the operation means in the test mode to an address generator which generates an address of a predetermined element.

5. The processor as claimed in claim 1, further comprising means for outputting at least one of the operation results output by the operation means in the test mode to a controller which controls an entire operation of the processor.

6. A processor comprising:

register means for storing operands and operation results;

operation means for performing operations on the operands and writing operation results into the register means in a normal operation mode;

random number generating means for generating random numbers and outputting, instead of said operands, the random numbers to the operation means in a test mode, the random number generating means comprising first means for generating a first random number;

second means for generating a second random number from the first random number; and third means for generating a third random number from the first random number, the second and third random numbers being applied to the operation means in the test mode; and selector means for selecting the operands from the register means in the normal operation mode and selecting the random numbers generated by the random number generating means in the test mode, the operands or the random numbers selected by said selector means being applied to the operation means.

7. The processor as claimed in claim 1, wherein said operation means comprises a plurality of operation units.

8. The processor as claimed in claim 1, wherein the processor further comprises an input part connected to said register means and said selector means via a bus, the input part receives the operands from an external device and outputs the operands to the bus in the normal mode, and the input part includes said random number generating means and outputs the random numbers to the bus in the test mode.

9. A processor having circuitry to perform a burn-in test, comprising:

an register unit storing operands;

a plurality of operations units operating on the operands;

a random number generator generating random numbers; and a selector selecting either the random numbers from the random number generator in a test mode or the operands from the register unit in normal mode to apply to the plurality of operation units.

10. A processing apparatus, comprising:

an operation unit performing processing operations; and a selector coupled to said operation unit and supplying one of an operand and a random number to said operation unit responsive to a mode of processing.

* * * * *